United States Patent [19]

Ledoux et al.

[11] 4,113,013
[45] Sep. 12, 1978

[54] ASPHALTENES AS SACRIFICIAL AGENTS IN OIL RECOVERY PROCESSES

[75] Inventors: Will A. Ledoux, Houston; William Schoen, Missouri City; Atul Kumar, Houston, all of Tex.

[73] Assignee: Texaco Inc., New York, N.Y.

[21] Appl. No.: 738,494

[22] Filed: Nov. 4, 1976

[51] Int. Cl.² .............................................. E21B 43/22
[52] U.S. Cl. ..................................... 166/275; 166/273; 166/305 R
[58] Field of Search ............ 166/273, 274, 275, 305 R

[56] References Cited

U.S. PATENT DOCUMENTS

| 2,876,840 | 3/1959 | Berry, Jr. | 166/305 R X |
|---|---|---|---|
| 3,084,744 | 4/1963 | Dew et al. | 166/273 |
| 3,326,287 | 6/1967 | Corrin | 166/273 |
| 3,437,141 | 4/1969 | Brandner et al. | 166/273 |
| 3,783,944 | 1/1974 | Jennings et al. | 166/273 X |
| 3,804,173 | 4/1974 | Jennings | 166/274 X |
| 3,858,656 | 1/1975 | Flournoy et al. | 166/274 |
| 3,910,350 | 10/1975 | Mastroianni | 166/274 |
| 3,978,927 | 9/1976 | Kudchadker et al. | 166/273 |

Primary Examiner—Stephen J. Novosad
Assistant Examiner—George A. Suchfield
Attorney, Agent, or Firm—Carl G. Ries; Thomas H. Whaley; Kenneth R. Priem

[57] ABSTRACT

A process for producing petroleum from subterranean formations is disclosed wherein production from the formation is obtained by driving a fluid from an injection well to a production well. The process involves injecting into the formation via the injection well asphaltenes as sacrificial agents to inhibit the deposition of chemical recovery agents such as surfactant on the reservoir matrix. Normally the process would be carried out by first injecting the asphaltenes into the formation through the injection well and following them with a chemical recovery agent. The chemical recovery agent would then be followed by a drive fluid such as water to push the materials to the production well.

4 Claims, 4 Drawing Figures

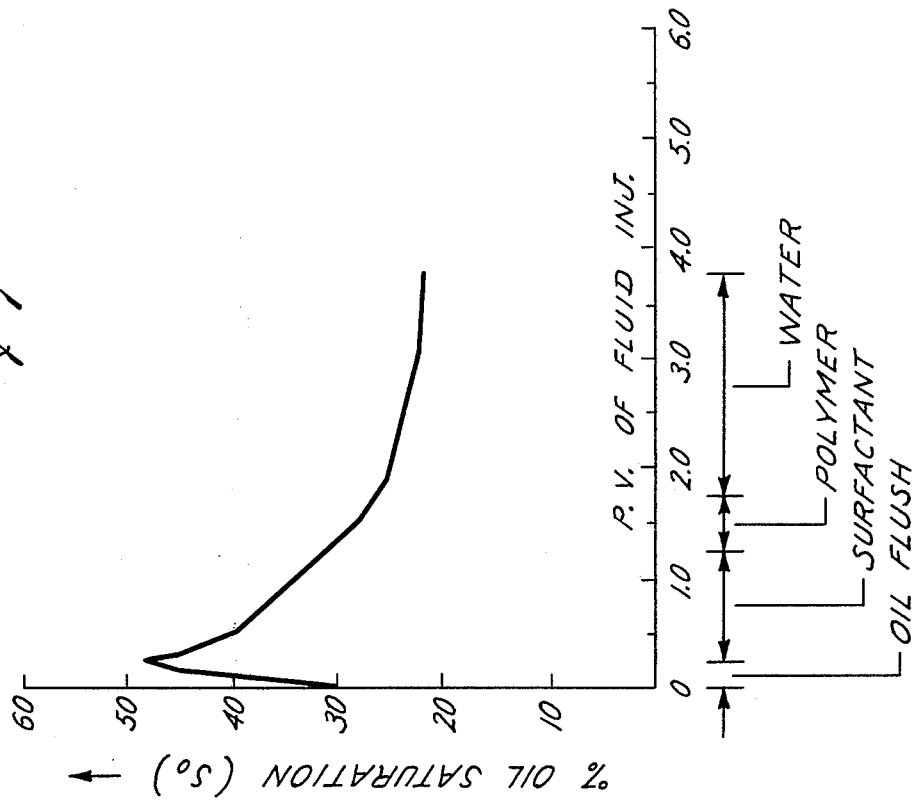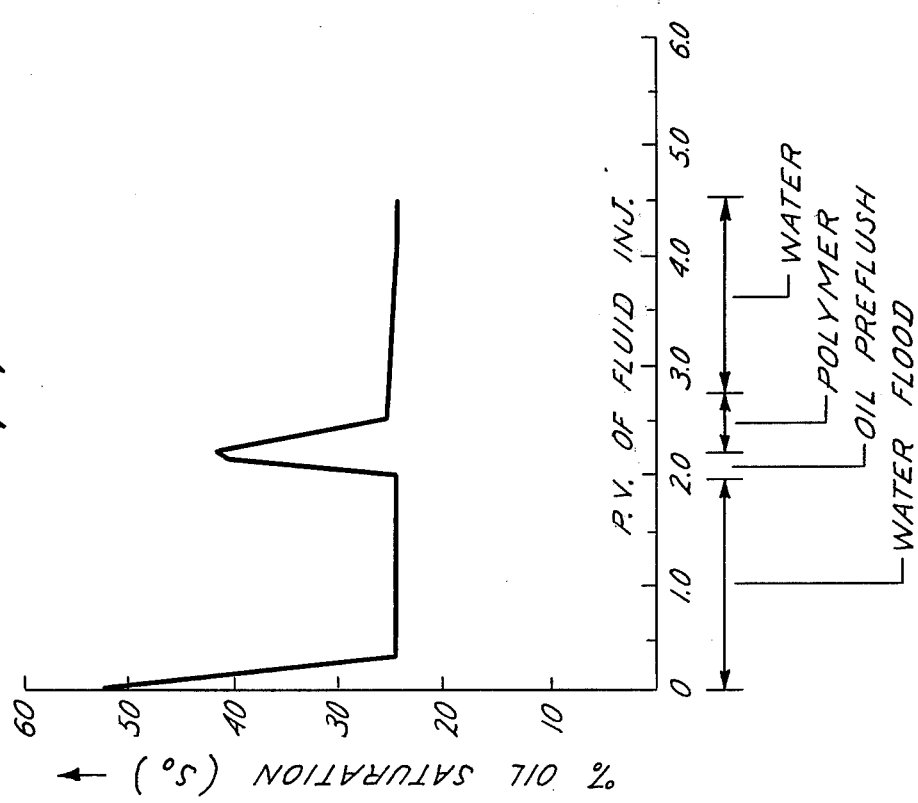

ASPHALTENES AS SACRIFICIAL AGENTS IN OIL RECOVERY PROCESSES

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65–90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the production well. A major disadvantage to water flooding, however, it is relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution affecting a reduction in this interfacial tension between water and oil would provide a much more efficient recovery mechanism. Therefore, the inclusion of a surface active agent and/or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants have been discovered to have special properties useful in water flooding operations such as a tolerance for high salinity and calcium, magnesium and/or ion concentrations often found in reservoir waters.

However, field operations employing surfactants (surface active agents) in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery techniques involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the gross portion of the reservoir which is swept and unswept by the injected fluid. A major cause of poor sweep efficiency is associated with the fact that the injected displacing fluid generally has a lower viscosity than the displaced fluid, i.e. petroleum. Thus, the injected fluid has a higher mobility and tends to finger through the oil, prematurely breaking through to the production well.

The solution to this mobility ratio problem is to increase the viscosity of the driving fluid. One way to do this is to add polymeric organic materials to a driving water which has the effect of increasing the viscosity of the water, thereby increasing the sweep efficiency of the supplemental recovery process. U.S. Pat. Nos. 3,039,529 and 3,282,337 teach the use of aqueous polyacrylamide solutions to increase the viscosity of the injected fluid thereby promoting increased sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrificial compounds have been added to pretreat the formation in order to decrease the adsorption of subsequently injected surfactants and/or polymers. For example, U.S. Pat. No. 3,414,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with a saline solution of a surfactant having both a high and a low molecular weight component. Copending application Ser. Nos. 612,118, now U.S. Pat. No. 3,978,927 and 612,114, now U.S. Pat. No. 4,021,356 Sept. 10, 1975 disclose the use of alkoxylated asphalts in oil recovery methods.

BRIEF DESCRIPTION OF THE DRAWINGS

FIG. 3 depicts a polymer flood preceded by a preflush of high asphaltene crude.

FIG. 4 depicts a surfactant flood preceded by a preflush of low asphaltene crude.

SUMMARY OF THE INVENTION

Figure 2:
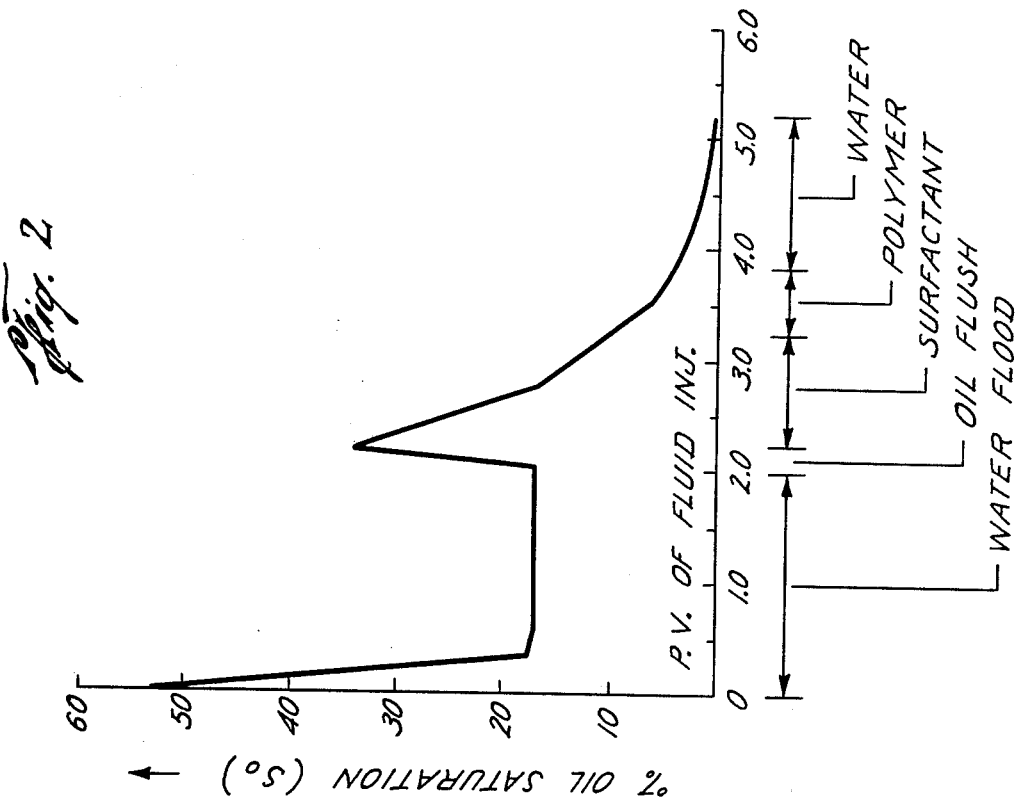
FIG. 2 depicts a surfactant flood preceded by a preflush of high asphaltene crude.

The invention is a process of producing petroleum from subterranean formations having an injection well and a production well in communication therewith. The process comprises injecting into the formation via the injection well asphaltenes and then injecting via the injection well into the formation a chemical oil recovery agent, for example, surfactant. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extent of adsorption of the more expensive chemical oil recovery agent injected therebehind. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional groups on the sacrificial agent molecules enhances adsorption either by hydrogen bonding or electrostatic attraction to active sites on the rock surfaces.

A satisfactory sacrificial material has at least three important characteristics. First, it should be less expensive than the surfactant since it cannot be recovered. Next, it must be adsorbed readily by the subterranean formation matrix. Preferably the sacrificial material should be adsorbed more readily that the chemical oil recovery agent to be used in the process. This will enable the sacrificial agent to be used not only as a preflush but in admixture with the chemical recovery material. The third important characteristic of a sacrificial agent is that the presence of such adsorbed sacrificial material must retard or eliminate the subsequent adsorption of the surfactant and/or polymer chemical recovery material on the adsorption site of the formation rock. By adsorption sites of the formation rock is meant those parts of the surfaces of the pores of the formation rock capable of adsorbing a chemical compound from a solution on contact.

The sacrificial material does not always have an appreciable effect on the recovery efficiency of the chemical flooding operation. Additional oil is generally recovered only if the sacrificial material is followed by or is admixed with a surfactant recovery agent which will effectively increase the amount of oil displaced from the subterranean formation. When a surfactant is chosen as the chemical recovery agent it may be injected after the sacrificial agent and/or in admixture therewith and ahead of the following trailing fluid thereby achieving the desired interfacial tension reduction between the injected fluid and the displaced fluid without loss of surfactant on the formation matrix. The surfactant may be present in a hydrocarbon solvent or in an aqueous solution or in a combination thereof. Any type of surfactant known in the art may be used in the practice of this invention. Some types of surfactants are mentioned previously. In addition, surfactants disclosed and claimed in the following U.S. patents are particularly useful since they have been found to be capable of performing in reservoirs having both high salinities and high hardness levels: U.S. Pat. Nos. 3,858,656; 3,811,505; 3,811,504; 3,811,507.

Likewise, the amount of surfactant which must be employed in the practice of any chemical flood is generally known in the art and is to be found in published literature. However, the concentration of surfactant generally will range from 0.01 to 0.5 pore volumes of an aqueous surfactant solution having dissolved therein from 0.001 to 5.0 percent by weight of the surfactant itself. As mentioned before, in additional to a preflush or a substitution thereof, a small amount of the sacrificial material may also be added to the surfactant solution to prevent the adsorption of the surfactant on the formation matrix.

In one embodiment of this invention, a sacrificial material comprising asphaltenes may be injected via a suitable injection means, i.e. through one or more injection wells completed in the subterranean hydrocarbon formation, so that the asphaltenes enter the formation ahead of the surfactant. The surfactant is then injected into the subterranean hydrocarbon-containing formation followed by the injection water to drive it to the production well. By injecting the asphaltenes in this particular sequence, the sacrificial material adsorbs on and occupies the sites existing in the matrix of the formation thereby eliminating or substantially decreasing the tendency for the subsequently injected surfactant and/or polymer to adsorb on the rock matrix.

The sacrificial agents useful in the process of my invention are asphaltenes.

The chemical composition of asphaltenes is complex and eludes precise definition. However, those skilled in the art will have no difficulty in determining what materials are suitable for this invention from the following description. Asphaltenes are generally considered to be high molecular weight pi-systems of polyalkylsubstituted polyaromatics as well as heteroatom containing polyaromatics.

*Asphalts*, Traxler, (Reinhold 1961) gives an in depth description of asphalts and its components. Asphaltenes in their pure form are the hard components of asphalt but do not include the lower molecular weight components of asphalt. Asphaltenes are the hard, high molecular weight materials which are insoluble in n-pentane. The lower molecular weight asphaltic materials which are soluble in n-pentane are known as resins and oils. Traxler notes that the mean molecular weights of resins and oils range from 370 to 900 while the value for asphaltenes range from 700 to 1600.

Since pure asphaltenes are hard solids and are, therefore, not suitable for injecting into subterranean reservoirs it is necessary to use a liquid high in asphaltene content. This may be accomplished most efficiently by using petroleum high in asphaltene content as the injection fluid. The suitable asphaltene rich petroleum may be used alone if its viscosity permits or it may be reduced in viscosity by dilution with a suitable solvent.

The quantity of asphaltenes to be injected into the subterranean hydrocarbon formation may be any amount up to and including an amount sufficient to occupy substantially all of the active sites of the formation matrix. If less than the maximum amount is used, there will be a corresponding reduction in the adsorption of surfactant from injection solution onto the formation matrix although the amount of reduction will not be as great as in the case where the formation matrix is completely saturated with asphaltenes. At a maximum only the amount of asphaltenes needed to completely occupy the active sites on the formation is needed. Using excess sacrificial material would result in an unnecessary increase in the cost of operating the oil recovery program.

The amount of asphaltenes needed in the process of the invention depends on the particular formation, the area or pattern to be swept and other formation characteristics. It is convenient to express the quantity of sacrificial agents needed in terms of pounds of material per acre foot of formation for the particular pattern which the injection fluid is expected to sweep. Ordinarily from about 15 to about 150 pounds per acre foot of formation of the asphaltenes described in the specification would be sufficient to prevent substantial adsorption of surfactant from the injected surfactant solution.

The technique described herein and claimed hereinafter is not limited to the particular examples given and embodiments hereto pointed out.

As effective embodiment of this technique uses a preflush of asphaltenes. The asphaltene could be present in asphaltene containing crude, solvent dissolved asphaltenes or solvent diluted asphaltene containing crude. For example, using a preflush of a crude high in asphaltene content. As the following data will show, crudes which do not have a high asphaltene content are not effective.

Also, the asphaltenes could be separated from crude and dissolved in a suitable solvent and used as a preflush. Such solvents include aromatic solvent, diesel, oil and kerosene to name a few. Many solvents will not dissolve asphaltenes, but those skilled in the art are aware of those solvents which solubilize asphaltenes.

In another embodiment of our invention asphaltene containing crude, pure asphaltenes, solvent dissolved asphaltenes, or solvent diluted asphaltene containing crude could be incorporated in the chemical slug. This would probably take the form of an emulsion. This emulsion could optionally be preceded by a preflush of asphaltene containing fluid.

Use of a solvent is not always necessary where an asphaltene containing crude is to be used. However, where the viscosity of the crude is such that a solvent is called for the solvents previously mentioned are recommended.

EXPERIMENTAL

Three floods were conducted on Manvel cores using oil and water samples from the Manvel Oligocene formation to determine the effectiveness of a mixture of 50% asphaltene crude and 50% Texaco aromatic solvent (to be referred to as asphaltene preflush) as a preflush in a surfactant flood. The surfactant system used in all of these floods consisted of 0.5% Alipal (alkyl aryl polyethoxylated sulfate) 436 + 0.5% Na salt of SA-597 (dodecyl benzene sulfonate) + 9% fresh water + 90% field brine. Initial oil saturation was established in the cores and then water floods were conducted to reduce the oil saturation to residual oil saturation.

Figure 1:
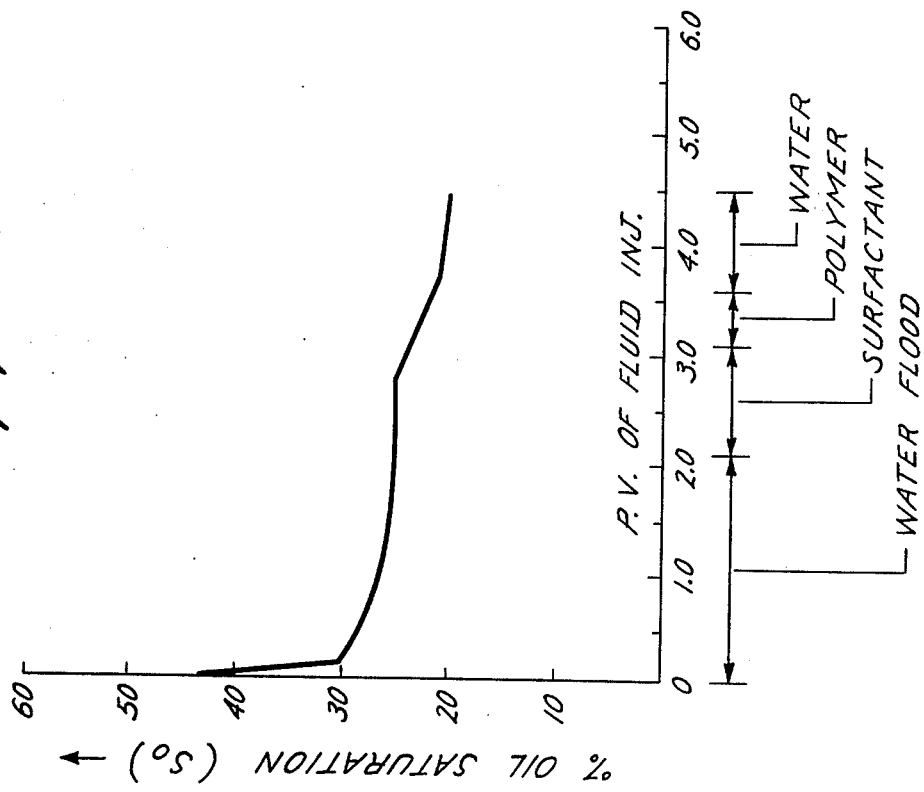
FIG. 1 depicts a surfactant flood.

FIG. 1 shows the results of a flood on Manvel core #13. The residual oil saturation in the core at the end of the waterflood was 25%. A one (1) PV slug of the surfactant solution was injected in the core. This was followed by the injection of ½ PV of *Nalco polymer* (polyacrylamide) at 500 ppm conc. These slugs were displaced through the core by the formation water. The oil saturation in the core at the end of tertiary recovery was 20%. The surfactant flood resulted in the recovery of only 20% of the oil remaining in the core at the end of waterflood, indicating an unsatisfactory flood performance.

FIG. 2 shows the results of flood on Manvel sand pack #14. The residual oil saturation in the sand pack at the end of the waterflood was 17%. A ¼ PV slug of high asphaltene preflush oil was injected in the sand pack. This was followed by the injection of one (1) PV slug of surfactant and ½ PV Nalco polymer slug at 500 ppm. conc. These slugs were displaced through the sand pack using formation water. This flood resulting in a reduction in the oil saturation from 17% at the end of the waterflood to 0.6% at the end of tertiary recovery. The flood recovered volume of oil equivalent to the injected preflush oil, plus 98% of the oil remaining in the core at the end of the waterflood.

FIG. 3 shows the results of Manvel sand pack #16. The residual oil saturation in the sand pack at the end of the waterflood was 25%. A ¼ PV slug of asphaltene preflush was injected in the sand pack. This was followed by the injection of ½ PV slug of Dow's pusher 500 polymer (polyacrylamide) at 500 ppm conc. These slugs were displaced through the sand pack using formation water. The oil saturation in the core at the end of the tertiary flood was 25%, which was the same saturation as after the waterflood. The flood recovered a volume of oil equivalent to the preflush oil only.

FIG. 4 shows the results of a flood on a sand pack (previously waterflooded) using a preflush of low asphaltene content crude. A one-fourth pore volume preflush of low asphaltene containing curde was injected into the sand pack followed by a one pore volume slug of surfactant. This was followed by the injection of one-half pore volume of Nalco polymer (polyacrylamide) at 500 ppm. These slugs were displaced by formation water. The oil saturation at the end of the water flood was 30%. At the end of the tertiary flood the oil saturation was 22% representing a recovery of only 27% of the oil remaining at the end of the water flood compared with 98% recovery in FIG. 2.

CONCLUSION

From the above tests it is concluded that high asphaltene crude oil when injected ahead of surfactant in a surfactant flood significantly improves the tertiary recovery of oil.

We claim:

1. A process for recovering oil from a subterranean reservoir when a surfactant is injected into the reservoir to sweep oil from the reservoir, the improvement which comprises:

injecting asphaltenes mixed with the surfactant.

2. A process as in claim 1 wherein the asphaltenes are present in a crude oil.

3. A process as in claim 1 wherein the asphaltenes are in solution in a solvent.

4. A process as in claim 1 wherein the asphaltenes are in a crude oil diluted with solvent.

* * * * *